United States Patent
Gray et al.

(10) Patent No.: US 9,348,720 B2
(45) Date of Patent: May 24, 2016

(54) METHOD FOR TESTING THE RELIABILITY OF COMPLEX SYSTEMS

(71) Applicant: UPTIME ENGINEERING GMBH, Graz (AT)

(72) Inventors: Christopher Gray, Graz (AT); Nikolaus Haselgruber, Graz (AT); Franz Langmayr, Graz (AT)

(73) Assignee: UPTIME HOLDING GMBH, Graz (AT)

( * ) Notice: Subject to any disclaimer, the term of this patent is extended or adjusted under 35 U.S.C. 154(b) by 126 days.

(21) Appl. No.: 13/966,233

(22) Filed: Aug. 13, 2013

(65) Prior Publication Data
US 2014/0047271 A1    Feb. 13, 2014

(30) Foreign Application Priority Data
Aug. 13, 2012  (EP) .................................... 12180254

(51) Int. Cl.
G06F 11/00    (2006.01)
G06F 11/26    (2006.01)
G05B 23/02    (2006.01)

(52) U.S. Cl.
CPC ............ *G06F 11/26* (2013.01); *G05B 23/0251* (2013.01); *G06F 11/008* (2013.01)

(58) Field of Classification Search
CPC ..... G05B 23/02; G06F 11/261; G06F 11/263; G06F 17/5022
See application file for complete search history.

(56) References Cited

U.S. PATENT DOCUMENTS

| | | | | |
|---|---|---|---|---|
| 7,430,688 B2* | 9/2008 | Matsuno | ............. | H04L 43/0817 709/224 |
| 7,437,611 B2* | 10/2008 | Agarwal | ............. | G06F 11/0709 714/26 |
| 7,962,789 B2* | 6/2011 | Sampige | ................. | G06F 11/26 714/26 |
| 8,041,996 B2* | 10/2011 | Rathunde | ............ | G06F 11/0709 714/26 |
| 8,418,000 B1* | 4/2013 | Salame | ................. | G06F 11/079 714/26 |
| 9,218,231 B2* | 12/2015 | Li | ........................ | G06F 11/0709 |
| 2008/0059840 A1 | 3/2008 | Takezawa et al. | | |
| 2009/0144012 A1* | 6/2009 | Haufe | ................... | G06F 11/263 702/117 |
| 2009/0144409 A1* | 6/2009 | Dickerson | ........... | G06F 11/3495 709/224 |
| 2009/0300423 A1* | 12/2009 | Ferris | ...................... | G06F 11/36 714/38.1 |
| 2010/0318846 A1* | 12/2010 | Sailer | ................. | G06F 11/0748 714/26 |
| 2012/0239320 A1* | 9/2012 | Frei et al. | ........................ | 702/58 |

OTHER PUBLICATIONS

Krishnasamy et al.,"Development of a risk-based maintenance (RBM) strategy for a power-generating plant", Journal of loss prevention in the process industries, Mar. 1, 2005, pp. 69-81, vol. 18, No. 2, Elsevier, United Kingdom.

* cited by examiner

*Primary Examiner* — Amine Riad
(74) *Attorney, Agent, or Firm* — Jordan IP Law, LLC; Todd A. Vaughn (57) ABSTRACT

A method for testing the reliability of complex systems, and includes the evaluation and optimization of the availability of such systems.

19 Claims, 4 Drawing Sheets

METHOD FOR TESTING THE RELIABILITY OF COMPLEX SYSTEMS

CROSS-REFERENCE TO RELATED APPLICATIONS

The present application claims priority 35 U.S.C. §119 to European Patent Application No. EP 121 80 254.0 (filed on Aug. 13, 2012), which is hereby incorporated by reference in its entirety.

TECHNICAL FIELD

Embodiments of the invention relate to a method for testing the reliability of complex systems, and includes the evaluation and optimisation of the availability of such systems.

BACKGROUND

Investigation of the reliability of complex systems is an important part of the design and production process. To obtain reliable results about reliability it is not sufficient just to perform tests but it is also necessary to plan a test program carefully and also to analyse test results in a way so that statistically reliable results can be obtained.

Such a method generally comprises steps of: (a.) establishing a system hierarchy of several levels by identifying components of the system; (b.) identifying and assigning failure modes to components; (c.) determining test procedures for failure modes of different components to obtain estimates for the availability of the component; and (d.) determining test procedures for failure modes of different components to obtain estimates for the availability of the component.

In establishing a system hierarchy of several levels by identifying components of the system. A system is a complex technical entity like a machine, a vehicle or the like consisting of several parts, here designated as components. Components may consist of parts themselves, so that a hierarchy is established in which the system consist of several components of a first level. At least some of these first level components consist of components of a second level and so forth. Here the term subcomponent is used for a part of a component of a higher level. In this step, the system is analysed and a tree of components is identified, representing the system hierarchy.

Identifying and assigning failure modes to components. All components are analysed to detect possible failures which may cause a malfunction of the system causing unavailability. These failure modes are described in all their aspects to get comprehensive information including: (i.) kind of failure, e.g., wear, (ii.) location of failure, e.g., sliding surface, cause-effect-chain, e.g., high local pressure, high temperatures, partial melting of surface, adhesive wear, crack formation, (iii.) observable stress parameters, and (iv.) precursors.

Usually some components may have several failure modes, some of them only one. It may occur that a certain component has no failure mode assigned, but in this case at least one subcomponent should have a failure mode assigned.

Another very important parameter connected with each failure mode is the expected downtime of the system in the case of such failure, including time for detection, delivery of spare parts and repair.

Availability is the percentage of operation time the component is working. Any failure occurring results in a downtime until a successful repair is finished and this downtime represents the unavailability of the system.

Determining test procedures for failure modes of different components to obtain estimates for the availability of the component. At least one test is selected. In prior art solutions these tests are designed in a way that it can be shown by statistical calculations that a predetermined lifetime can be achieved. In detail a sufficient duration of the test is determined which can be compared to a certain time of consumer operation (equivalent duration).

The disadvantage of such procedure is that tests have usually to be designed in a special way to obtain a prognosis of lifetime or availability and that in complicated cases some tests may be too stringent. At the same time it is possible to overlook potential risks.

SUMMARY

In accordance with embodiments, a method is provided which avoids the aforementioned disadvantages and to provide reliable information about the availability of technical systems with the least amount of tests and other efforts for evaluation.

Now the additional steps will be explained further.

Identifying a level for allocating availability targets to components and thus establishing a hierarchical decomposition of the system. It is an important step to ensure that the hierarchical tree representing the system is a complete decomposition. That means that every horizontal section through the tree will comprise each component of the system either directly or represented by the respective subcomponents.

In principle it is possible to divide each component into some subcomponents and so forth. However, there is a reasonable limit for such breakdown. At such limit the function and availability of a component can be assessed in a sufficient way and there is no need for going into more detail. From another point of view this level of maximum depth is chosen in the sense that reasonable tests are available for this level but not below. It is useful to allocate availability targets also on this level.

It has to be said that in practice this step may be conducted before steps b. and c.

Allocating availability targets to the components identified in the previous step by qualitative methods considering experience, criticality of failures and novelty of design or material, said availability targets combined result in an overall availability target of the system, and identifying those targets which need to be analysed.

An important feature of embodiments of the invention is to allocate availability targets to components in such a way that an overall target for the system is achieved which is sufficient to meet the demands of the user of the system. Qualitative in this context means that the allocation is conducted not according to exact mathematical or statistical procedures, but according to a heuristic approach in which all kinds of experience is considered. For example, through this approach the use of a new material or the use of a new supplier of a part will typically result in a need for investigation. Only those components which are well understood, which have a history free from problems and where no new circumstances are observed can be deemed uncritical so that no tests have to be conducted, i.e. they do not have to be analysed. Nevertheless some residual availability target is assigned also to such component. However, it is assumed that this target is met even if no tests are conducted.

Calculating a projected availability of all components, having targets which need to be analysed, which is an estimate of the most probable value of availability provided that the tests are successful.

If all the planned tests are carried out without any failure, a demonstrable survival probability and a demonstrable availability can be calculated. These values are conservative lower confidence bounds of the actual survival probability and the actual availability. This means that the true survival probability and the true availability regarding each failure mode is expected to be higher than the corresponding lower bound at a certain confidence level.

It has been found that aggregation of availability on the basis of demonstrable availability leads to results which are far too conservative i.e. the risk of failure is overestimated to an extent which depends on the number of tests and the distribution of failures.

As long as no failures appear, a true expected value of the survival probability/availability cannot be calculated. The invention now is based upon the use of a projected availability which substitutes the expected values. These are the measures which will be used for the aggregation of the failure mode related availability values towards the total system availability.

Identifying components for which availability targets are not met by said projected availability and select another test to improve projected availability or increase the severity of tests already selected until availability targets are met. In this step those components which are identified to be validated obtain additional test efforts either in terms of additional tests or in terms of conducting the same tests more often or longer.

Calculating an overall availability of the system. Since in all practically relevant cases the percentage of time in which the system may be unavailable is small the overall availability may be obtained by adding up the availability of components.

It has to be noted that the method in accordance with embodiments of the invention does not make it necessary to design tests for assessment of availability only. The contribution to the calculation of any test which can give some information about possible failure of a component which is readily available can be used.

Tests are conducted with components or the entire system, wherein it is preferable to test components of the lowest level possible. Each test can produce information about some of the failure modes of the component tested or of subcomponents thereof. It may occur that a certain test does not contribute to assessment of other failure modes.

Preferably it can be foreseen that different tests are carried out and combined to calculate risk of a specific failure mode. So for example a pulsation rig test, an overload test and a vehicle test can contribute to investigation of the failure mode high cycle fatigue of a connecting plate of a hydraulic system as described later.

The above explanations relate to a planning of the validation activities during the design and development phase of a system. In this phase tests are planned in order to obtain information about availability under the condition that test results are positive. The present invention relates also to a method in which then tests are actually conducted and depending on the outcome optionally changes in the test program are considered and perhaps other actions are taken.

Having calculated the overall availability of the system, tests are actually carried out and the method is extended by performing an evaluation of the extent to which additional tests or design changes are needed due to failed tests.

DRAWINGS

Embodiments of the invention are explained in detail with reference to the accompanying drawings, in which.

DESCRIPTION

Figure 1:
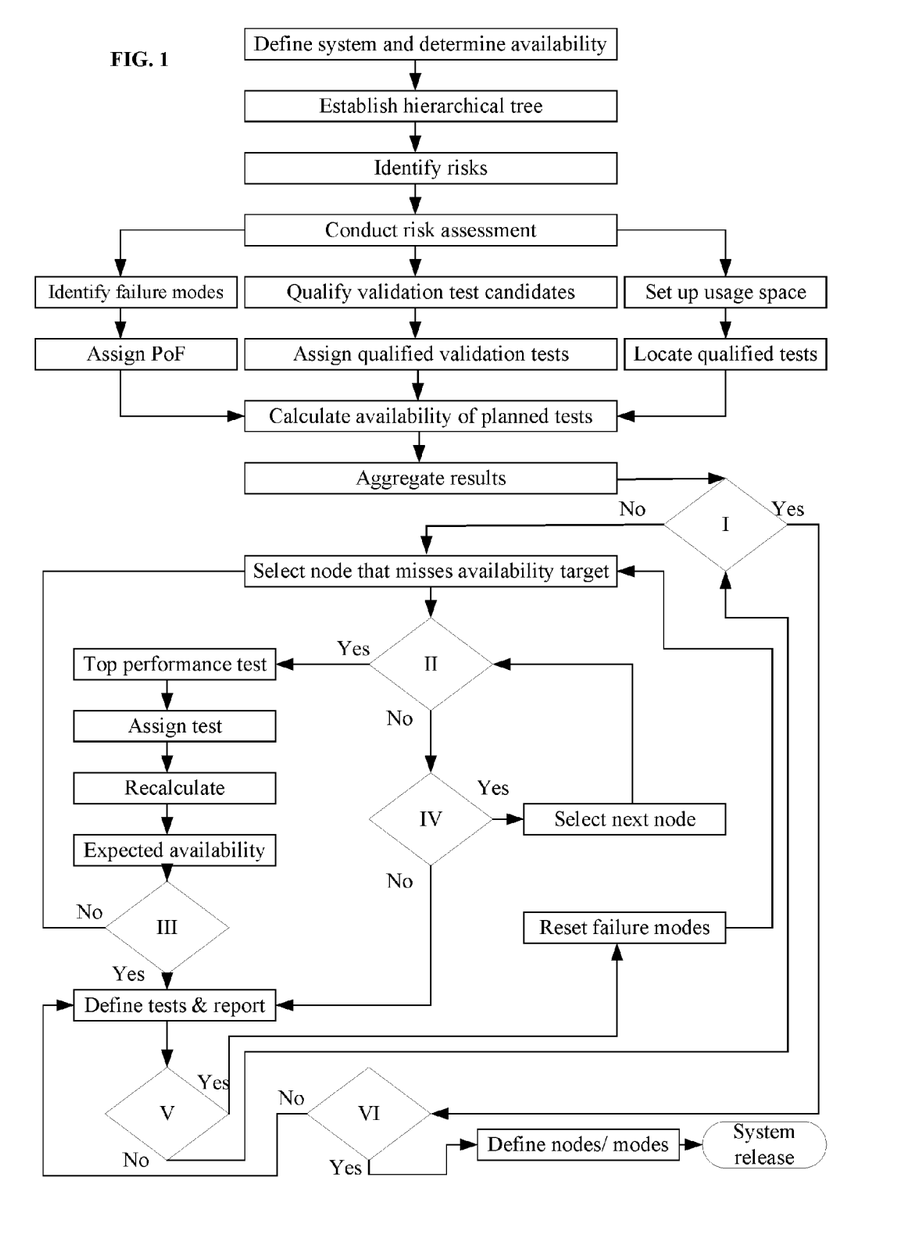
FIG. 1 illustrates a flowchart showing a method in accordance with embodiments of the invention.

Initially, embodiments of the method is explained with reference to FIG. 1.

In step 1, the system to be investigated is defined and an overall availability is determined, which has to be achieved. In step 2, a hierarchical tree is established containing all components of the system representing its structure. In step 3, technical and complementary risks are identified which may affect the product availability and these risks are assigned to the corresponding system tree nodes which represent the components of the system. In step 4, risk assessment is conducted by considering relevant circumstances influencing the risk of failure connected to the individual components and availability targets are allocated on the basis of such assessment.

Steps 5a1 to 5c2 may be conducted partially parallel to each other so they are represented in three branches.

In step 5a1, potential priority failure modes are analysed and assigned to the nodes of the system tree. Stress parameters are identified which are relevant for setting up a physics of failure model. In step 5a2, a physics of failure model (PoF) is assigned to each failure mode. In step 5b1, validation test candidates are qualified according to efficiency with regard to cumulative damage intensity. In step 5b2, qualified validation tests are assigned to the corresponding nodes of the system tree. In step 5c1, the consumer usage space is set up, the demands of target market are analysed, weighted Principal Component Analysis (PCA) with measurement data is carried out. In step 5c2, qualified validation tests are located and expected reference duty cycles in the usage space are identified.

In step 6, demonstrable availability is calculated for each planned test in view of relevant failure modes in view of the reference profile. In step 7, the obtained results are aggregated to values for the projected availability for each tree node.

In step I, it is determined whether projected availability is acceptable, i.e., whether it meets the target for each tree node. If the answer is yes, then proceed to step VI. If, however, the answer is no, then proceed to step 8.

In step 8, from all tree nodes with insufficient availability the node is selected for which the availability target is missed with the largest deviation.

In step II, it is determined whether any qualified test for the failure modes of the selected node is available. If the answer is yes, then proceed to step 9. If, however, the answer is no, then proceed to step IV.

In step 9, the top performance test is selected for this node. In step 10, this test is assigned to the lowest possible level of the system tree. In step 11, the demonstrable availability and the projected unavailability are recalculated for all affected tree nodes. In step 12, the expected (projected) availability of the system is determined based on the adjusted test program under consideration of assigned risks and all identified a priori failure modes.

In step III, it is determined whether projected availability is acceptable, i.e., whether it meets target requirements. If the answer is yes, then proceed to step 14. If the answer is no, then return to step 8.

In step IV, it is determined whether any other node is available to be selected. If the answer is yes, then proceed to step 13. If the answer is no, then proceed to step 14.

In step 13, the next node in ranking of unavailability is selected. In step 14, the defined tests are carried out and the results are reported.

In step V, it is determined whether any observed failures in tests require design changes. If the answer is yes, then proceed to step 15. If the answer is no, then return to step 1.

In step 15, the test contributions for all relevant failure modes at the tree nodes affected by the design change are reset, and returned to step 8.

In step VI, it is determined whether tests are already carried out. If the answer is yes, then proceed to step 16. If the answer is no, then return to step 14. In step 16, the scope of tree nodes and failure modes for an early warning system are defined, if necessary. In practical applications it can be expected that boundary conditions do not allow for increased severity or extension of the validation program for each failure mode not validated sufficiently. In particular this could apply for failure modes which have to be re-validated because of failures observed during the execution of the validation program, especially if they require real-time to appear, such as (corrosion, clogging by deposition etc.). In such cases it might be decided that the system is released under the condition that those failure modes which could not be validated sufficiently are monitored with particular care in an early warning system. In step 17, conditioned system release.

Now embodiments of the invention will be explained using an example which is given for demonstration only and not intended to limit the scope of the invention. The example describes the assessment of a hydraulic system.

The steps are in the order as conducted, but designated with the same letters as the steps of the claims.

Initial Step involves definition of objective and availability target. The availability of the hydraulic system HS01 in customer operation has to be ensured as early as possible in the development phase as it is a key product characteristic. The annual operation time per year is 3600 h. The overall availability target is 99% over the first three years in service. Unavailability of the system appears as soon as a failure event occurs which causes system downtime to carry out the required repair action. Eventually required scheduled maintenance actions are carried out in the time periods where the system is not operated (e.g., over night, during the weekend).

The mean time to repair, i.e., the average time required for a repair or renewal action is assumed to be independent from the affected component as the main job for these actions is the disassembly of the system from the vehicle which is assumed to be required in each case of unavailability. The mean time to repair is assumed to be 18 h. In general the mean time to repair depends on the affected component and on the observed failure mode.

a. Definition of Scope

The hydraulic system to be considered is represented by the following tree structure:

TABLE 1

| Hydraulic System |
|---|
| Connecting Plate |
| Control Disc |
| Axial Piston Unit |
|   Piston |
|   Cylinder |
|   Retraction Unit |
|   Retraction Plate |
| Swash Plate |
|   Plate |
|   Bearings |
| Drive Unit |
|   Drive Shaft |
|   Bearings |
| Controller Unit |
|   Control Piston |
|   Actuator |

Table 1 is a hierarchical tree of a hydraulic system with assembly layer (connecting plate, control disc, . . . ) and component layer (piston, cylinder, . . . ). This hierarchical tree provides a complete decomposition of the hydraulic system. The circumstance of completeness at least on the first level below the root (assembly level) is mandatory since the assessment of system availability is based on the availabilities of assemblies and components.

e1. Identify Risks—Risk Filter

A product can be seen as successful if the development is finished as planned in time and budget and it provides its intended function over a defined period of time without any repair action. In this context, the term risk describes an increased probability that the product success is not reached.

All assemblies of the hydraulic system are assessed regarding risks resulting from various categories (technical, time, organisational, production, economic). Since risks are hard to quantify it is judged per category whether an increased risk is seen or not. Identified risk sets are inherited in the tree as the risk setting although they do not have any impact on the lower level as long as all children of one node inherit the same value.

TABLE 2

| | Development Risk d | | | | | | Production, technology & warranty risk p | | | | | |
|---|---|---|---|---|---|---|---|---|---|---|---|---|
| | Risk Filter | | | | | | | | | | | |
| | Technical Risk | | | | Time Risk | | Organizational Risk | Production, Quality, Maintenance | | | | Economic |
| | Risk Categories | | | | | | | | | | | |
| | Design | Load | Load Capability | Ability | Scope | Sequence | Boundary conditions | Work Split | Changes | Quality Assurance | Maintenability | Reputation |
| −Hydraulic System | Y | Y | Y | Y | Y | Y | N | Y | Y | N | Y | Y |
| +Connecting Plate | Y | N | Y | N | Y | N | N | N | N | N | N | Y |
| +Control Disc | N | N | N | N | N | N | N | N | N | N | N | N |
| +Axial Piston Unit | Y | Y | Y | Y | Y | Y | N | Y | Y | N | Y | Y |
| +Swash Plate | N | N | N | N | N | N | N | N | N | N | N | N |
| +Drive Unit | Y | Y | Y | Y | N | N | N | Y | Y | N | Y | Y |
| −Controller Unit | N | Y | N | Y | N | N | N | N | Y | N | Y | N |
| Control Piston | N | Y | N | N | N | N | N | N | Y | N | Y | N |
| Actuator | N | Y | N | Y | N | N | N | N | Y | N | Y | N |

Table 2 is a risk filter applied to the hydraulic system. As soon as at least one increased risk (Y) per assembly is identified, it will be analysed in more detail. For all assemblies of the hydraulic system except the control disc and the swash plate at least one increased risk has been identified.

e2. Allocation of Availability Targets

As identified hereinabove, the product is operated 3600 h per year. If one repair action requires 18 h and the availability should be 99%, at maximum 2 failures per system and year are tolerated.

For the availability assessment, the allowed number of failures per assembly and per component are derived based on the risk assessment of step a. The number of children per tree node is used as a weight factor of the risk to take the system complexity into account.

Table 3 is an allocation of availability targets for the hydraulic system. The maximum allowable number of failures per year for one node is distributed on its child nodes, starting with the overall target for the root. Consequently, all assembly targets (in max. allowed number of failures) sum up to the overall target while all component targets (in max. allowed number of failures) sum up to the target of the corresponding assembly node.

Each derived max. allowed number of failures is transformed into an availability target by using the annual operation time and the mean time to repair. E.g., for the connecting plate this is $3600*(1−0.125*18/3600) \approx 0.99938$.

b. A-Priori Analysis of Failure Modes

For all assemblies with increased risk, a failure mode analysis is carried out. In contrary to the well-known FMEA, where functions and mal-functions are identified and assessed with severity, occurrence and detection probabilities, here the focus is on the physical description of the failure phenomena by physics of failure models.

TABLE 3

| Tree Level | Node | Parent | Number of Children | Sum of Risks | Max. allowable # of Failures | Availability Target |
|---|---|---|---|---|---|---|
| 0 (system) | Hydraulic System | NA | 6 | 0 | 2.000 | 0.99000 |
| 1 (assembly) | Connection Plate | Hydraulic System | 0 | 4 | 0.125 | 0.99938 |
| 1 (assembly) | Control Disc | Hydraulic System | 0 | 0 | 0.025 | 0.99988 |
| 1 (assembly) | Axial Piston Unit | Hydraulic System | 4 | 10 | 1.100 | 0.99450 |
| 1 (assembly) | Swash Plate | Hydraulic System | 2 | 0 | 0.050 | 0.99975 |
| 1 (assembly) | Drive Unit | Hydraulic System | 2 | 8 | 0.450 | 0.99775 |
| 1 (assembly) | Controller Unit | Hydraulic System | 2 | 4 | 0.250 | 0.99875 |
| 2 (component) | Piston | Axial Piston Unit | 0 | 10 | 0.275 | 0.99863 |
| 2 (component) | Cylinder | Axial Piston Unit | 0 | 10 | 0.275 | 0.99863 |
| 2 (component) | Retraction Unit | Axial Piston Unit | 0 | 10 | 0.275 | 0.99863 |
| 2 (component) | Retraction Plate | Axial Piston Unit | 0 | 10 | 0.275 | 0.99863 |
| 2 (component) | Plate | Swash Plate | 0 | 0 | 0.025 | 0.99988 |
| 2 (component) | Bearings | Swash Plate | 0 | 0 | 0.025 | 0.99988 |
| 2 (component) | Drive Shaft | Drive Unit | 0 | 8 | 0.225 | 0.99888 |
| 2 (component) | Bearings | Drive Unit | 0 | 8 | 0.225 | 0.99888 |
| 2 (component) | Control Piston | Controller Unit | 0 | 3 | 0.111 | 0.99944 |
| 2 (component) | Actuator | Controller Unit | 0 | 4 | 0.139 | 0.99931 |

TABLE 4

| Assembly | Component | Failure Mode acc. to VDI 3822 | Location | Cause-effect-chain | Observable Stress Parameters |
| --- | --- | --- | --- | --- | --- |
| Connecting Plate | Connecting plate | Leakage | valve | Oil turbulence, acceleration of valve ball, impact seat hammering | System angel phi, pressures PR_system |
| Connecting Plate | Connecting plate | High cycle fatigue | high pressure to low pressure transient zone | Fatigue load due to hydraulic pressure fluctuation | PR_system |
| Axial piston unit | Cylinder | Thermal overload | sliding surface | High local pressure, high temperatures, partial melting of surface | N_pump, T_oil |
| Axial piston unit | Cylinder | Wear | sliding surface | Boundary lubrication, friction work abrasive wear | N_pump, PR_pump, T_oil |
| Axial piston unit | Piston | High cycle fatigue | Interface to retraction unit | Acceleration of piston, pulsating tension, fatigue crack | System angle phi, N_pump |
| Axial piston unit | Piston | Wear | interface to swashplate | Relative movement under high pressure | N_pump, PR_pump, T oil |
| Axial piston unit | Retraction unit | Wear | interface zone | High speed and high pressure of pump, local pressure maximum | System angle phi, N_pump, T_oil |
| Axial Piston Unit | Retraction plate | High cycle fatigue | Fillets | Pump rotation, rotating bending fatigue, crack formation | System angle phi, N_pump, PR_pump |
| Axial Piston Unit | Retraction plate | Wear | Interface to axial piston | Movement of swashplate, radial movement of axial piston | System angle phi, N_pump, T_oil |
| Drive unit | Drive shaft | High cycle fatigue | Notches at shaft gear | Torsional fatigue load on shaft, stress rising at gears, crack formation | System angle, PR_pump |
| Drive unit | Drive shaft | Wear | Bearings | Lack of hydrodynamic lubrication, surface contact | N_pump, PR_pump, T_oil |
| Controller Unit | Control piston | Wear | Interface to piston liner | High forces at high power, micro welding, wear | N_pump, system angle, PR_pump, T_oil |
| Controller Unit | Actuator | Wear | Piston to lever interface | Dynamic pump operation, high controler movemeent, pressure fluctuation | N_pump, system angle, PR_pump, T_oil |
| Controller Unit | Actuator | Leckage | sealings | Dynamic pump operation, high controller movement, pressure fluctuation, boundary lubricaton | N_pump, system angle, PR pump, T_oil |

| Assembly | Precursors | min. Sample | Corresponding Test | Repair Unit | Damage model |
| --- | --- | --- | --- | --- | --- |
| Connecting Plate | Controller problems, rising control pressure | pump | Pressure fluctuation test | pump | Dynamic operation(phi) * (PR_system) |
| Connecting Plate | Micro cracks | Pump | Pulsation rig test | Pump | Hcf (PR_system) |
| Axial piston unit | Wear marks, surface melting | Pump | Overload test | Pump | N_pump * 1/eta(T_oil) |
| Axial piston unit | Wear marks | Pump | Low speed full load test | Pump | 1/N_pump * PR_pump |
| Axial piston unit | Hardening, micro-cracks | Piston | Pulsation rig test | Piston | Hcf ((N_pump * sin(phi))$^2$) |
| Axial piston unit | Rising tolerances | Pump | Dynamic mass flow test | Pump | PR_system * (sin(phi) * N_pump) |
| Axial piston unit | Wear marks | Pump | Stationary high load test | Pump | Sin(phi) * N_pump |
| Axial Piston Unit | Hardening, micro-cracks | Axial piston unit | Pulsation rig test | Pump | Hcf ((N_pump * sin(phi))$^2$) |
| Axial Piston Unit | Wear marks | Pump | Dynamic mass flow test | Pump | Sin (phi) * N_pump |
| Drive unit | Micro cracks | Drive shaft | Torsional fatigue test | Drive shaft | Hcf (V * P_pump) |
| Drive unit | Wear marks, particles in oil | Pump | Dynamic mass flow test | Pump | Starts * dymamic operation (PR_pump) |
| Controller Unit | Controller malfunction | Pump | Vehicle operation | Controller | Threshold (phi) * PR_system |
| Controller Unit | Controller malfunction | Pump | Dynamic mass flow test | Controller | High PR_system * gradient (dP_pump) |
| Controller Unit | Oil marks | pump | Vehicle operation | Controller | Gradient (PR_system) |

Table 4 is list of analysed failure modes for the hydraulic system. For each failure mode identified, the cause-effect chain is identified together with the physical parameters required to build the physics of failure model. The result of this analysis is the physics of failure model to be applied for the description of the failure mode. E.g., the failure mode High cycle fatigue (HCF) for the connecting plate is described with the standard HCF model $n^*p^k$ where n is the rotational speed, of the system, p is the hydraulic pressure (the load characteristic in this case) and k the model parameter.

seconds used for the calculation. This selected customer usage profile serves as a reference for the assessment of the damage contributions of the tests.

f1. Calculate Availability Demonstration and Projection Per Failure Mode

For each of the failure modes identified in step b., the corresponding damage model is applied to all relevant tests and customer reference profiles. The illustration for this step is done with the failure modes of the connection plate:

TABLE 6

| | | | Planned Test | | | | |
|---|---|---|---|---|---|---|---|
| | | | pulsation rig test | overload test | vehicle test | pressure fluctuation test | dynamic load cycle test |
| Duration [h] | | | 20 | 300 | 800 | 2000 | 1500 |
| Number of | | | 6 | 2 | 3 | 2 | 2 |
| Assembly | Component | Failure Mode acc. to VDI 3822 | pulsation rig test | overload test | vehicle test | pressure fluctuation test | dynamic load cycle test |
| Connecting Plate | Connecting plate | Leakage | | 0 | 219 | 5.234 | 4.800 |
| Connecting Plate | Connecting plate | High cycle fatigue | 25.000 | 16.575 | 2.644 | 8.059 | 8.184 | c1. Test Program

The design verification plan for the hydraulic system is investigated regarding durability tests which may provide any contribution to system validation regarding availability. The following tests have been identified.

TABLE 5

| Test | Planned Duration [h] | Number of Repetitions |
|---|---|---|
| Pulsation Rig Test | 20 | 6 |
| Overload Test | 300 | 2 |
| Vehicle Test | 800 | 3 |
| Pressure Fluctuation Test | 2.000 | 2 |
| Dynamic Load Cycle Test | 1.500 | 2 |

Table 5 is a list of planned tests for the validation of the hydraulic system. The pulsation rig test is a component test for the connecting plate and tests against high cycle fatigue. So, this test is only relevant for this combination of component and failure mode while all the other tests are carried out with the complete system and provide therefore potential damage contributions for each node of the system tree. The number of repetitions shows with how many samples each test is carried out. A value of 6 means that 6 connection plates are tested on the rig test, each for 20 h. Also, 2 overload tests, each with a duration of 300 h is planned, etc.

c2. Customer Usage

The load variability of customer usage has to be investigated regarding all relevant observable variables listed in the failure mode analysis of step b. Since the application of the hydraulic pump in the example is crane operation the variability of customer load profiles is small and it has to be chosen to use only one reference profile for the assessment of the program. In general, more than one customer reference profile could be used.

Figure 2:
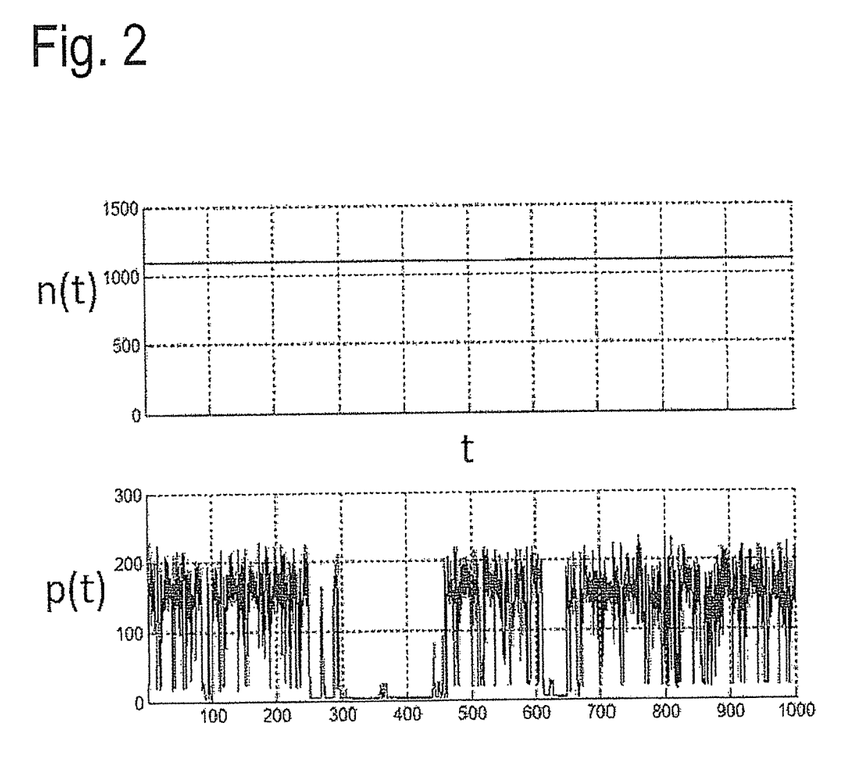
FIG. 2 illustrates diagrams representing the variability of consumer load over time a reference profile that includes two stress parameters (speed n(t) and pressure p(t)).

FIG. 2 illustrates customer reference profiles with two stress parameters (speed n(t) and pressure p(t)) over time t in Table 6 shows equivalent durations for each single test regarding the identified failure modes for the connecting plate of the hydraulic system. For the failure mode leakage, the pulsation rig test is not relevant as only the plate itself is tested there (without any interfaces to other components and without oil). The physics of failure model is based on dynamic operation of the system. Since the overload test is operated on constant maximum speed, there is no damage contribution regarding dynamic operation. The comparison of the damage for the vehicle test with that of the reference customer profile provides the result that 800 h of the vehicle test (i.e., one test run) is equal to 219 h of customer operation. On the other hand, 2000 h of the pressure fluctuation test is comparable with 5234 h of customer operation.

For the second failure mode (HCF), large contributions come from the pulsation rig test (as HCF is exactly the purpose of this test) as well as from the overload test. Also the dynamic tests provide substantial contributions.

For each failure mode, these equivalent durations are used to calculate the demonstrable max. allowable number of failures. Here, principles known from the literature are used. Again for the failure mode leakage of the connection plate the calculation is shown.

The required input is:

Annual operation time $t_a=3600$ h

Mean time to repair $t_r=18$ h

Equivalent durations of n tests $t_1, t_2, \ldots$ (here n=7 and $t_1=t_2=t_3=219$ h, $t_4=t_5=5234$ h, $t_6=t_7=4800$ h)

Weibull shape parameter $\beta=2$ ( . . . over time linearly increasing risk of failure)

Max. error probability of statistical test $\alpha$ (0.1, default setting, industry standard)

To determine the demonstrable availability, first the demonstrable survival probability after one year $\underline{S}(t_a)$, assuming Weibull distributed times to failure is calculated:

$$S(ta)=\alpha^{\wedge}(ta\beta/(t1\beta+\ldots+t7\beta))=0.1^{\wedge}(3600^2/(3^*219^2+2^*5234^2+2^*4800^2))\approx 0.7442$$

Thus, the demonstrable availability is $\underline{A}(t_a)=(t_a-t_r*(-\ln(\underline{S}(t_a))))/t_a=(3600-18*(-\ln(0.7442)))/3600\approx0.9985$.

This means that we expect the survival probability of the connecting plate regarding leakage after 3600 h to be higher than 74.42%. If one repair consumes on average 18 h we expect the corresponding availability to be greater than 99.85%.

Note that this result is exact only if at maximum one failure per component occurs in the period of consideration. This is a sufficiently good approximation for typical availability targets on component level, as those are close to 100%.

If all the planned tests are carried out without any failure, the demonstrable survival probability and the demonstrable availability are conservative lower confidence bounds of the actual survival probability and the actual availability. This means that the true survival probability and the true availability regarding each failure mode are expected to be higher than the corresponding lower bound. As long as no failures appear, the expected survival probability/availability cannot be calculated but instead, based on the risk numbers, a projected survival probability/availability is provided which substitutes the expected values. These are the measures which will be used for the aggregation of the failure mode related availability values towards the total system availability.

The projection works as follows. The demonstrable survival probability is a lower α-confidence bound, i.e., the true survival probability is greater than the demonstrated value with probability>(1−α)*100%. This relationship is illustrated in FIG. 3.

Figure 3:
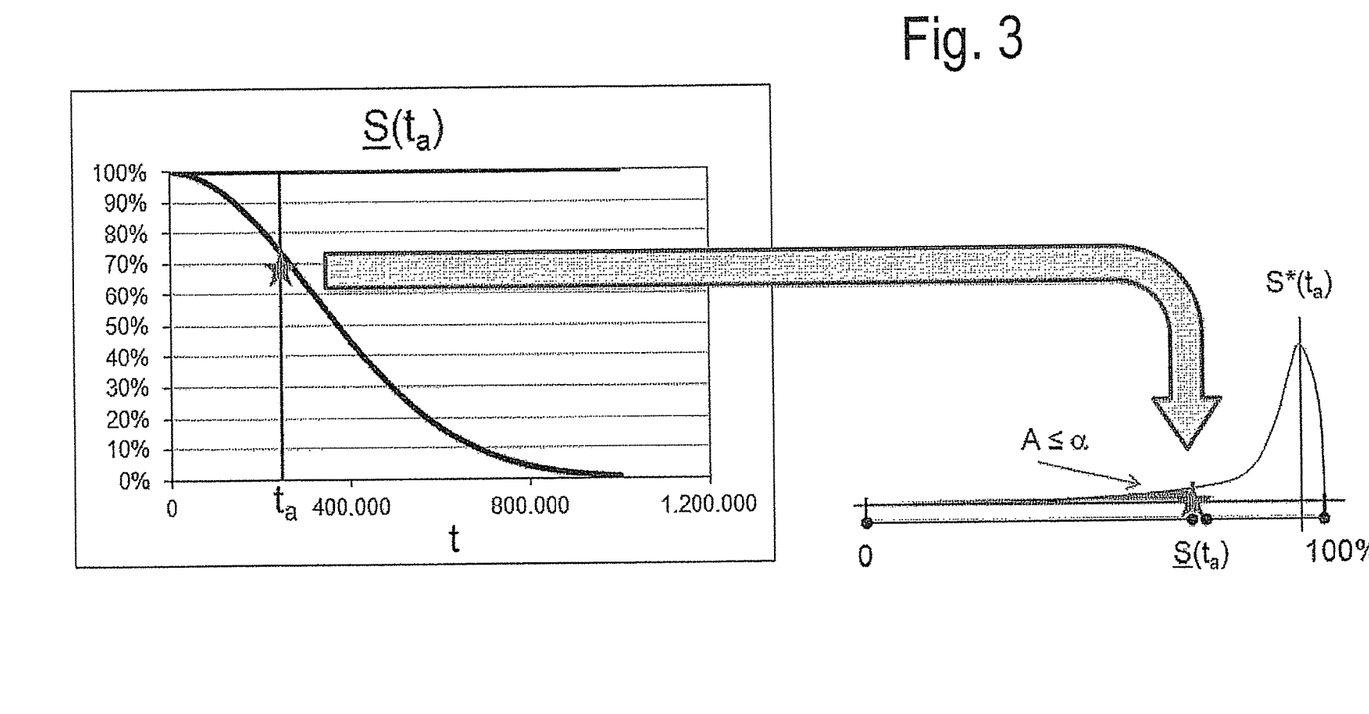
FIG. 3 illustrates a diagram showing the calculation of projected availability from a demonstrable availability.

In the left diagram of FIG. 3 the demonstrable survival probability S(ta) is represented over time t in operation hours. The assumption is a Weibull distribution with shape parameter β.

The right diagram of FIG. 3 shows a Beta distribution representing the projected survival probability S*(ta) depending on the demonstrable survival probability S(ta).

We assume that the projected survival probability follows a Beta distribution with parameters a and b. The parameter b is set 1 per default and will be decreased if historical information about warranty data indicates that for the related failure mode no problems have been occurred in the past. Decreasing b to a value <1 leads to a density with a vertical asymptote at $S(t_a)=1$. This means that if the related component/failure mode was inconspicuous in the past, the projected survival probability is increased. The parameter a is driven by the risk assessment and initialized with: exp((max possible total risk value−(total risk value−1))/2).

This ensures that a always is >1, i.e. the left branch of the beta density goes towards 0. If for those parameters a and b the area of the Beta probability density from 0 to $S(t_a)$ is >α the parameter a is increased until $S(t_a)$ is >α. Then, the projected survival probability $S*(t_a)$ is the expectation value of the finally selected Beta distribution, i.e., $S*(t_a)=a/(a+b)$.

Again, for the first component/failure mode, (connection plate, leakage), no historical information is available, thus, b=1. As the max. possible risk value is 12 (number of risk categories, compare risk filter above), and the total risk value for the connection plate is 4 (4 risks identified), a is exp((12−4−1)/2)=exp(3.5)≈33.12.

Since the area under the graph of the beta density left of $S(t_a)$, i.e. in the interval [0; 0.7442], is <α, the parameter a needs not to be adjusted furthermore. So, the assumed Beta distribution has the parameters a=33.12 and b=1. The projected survival probability $S*(t_a)=a/(a+b)=33.12/(33.12+1)=0.9707$. The projected availability is like for the demonstrated values $A*(t_a)=(t_a-t_r*(-\ln(S*(t_a))))/t_a=(3600-18*(-\ln(0.9707)))/3600\approx0.99985$.

These steps are carried out for all the components and failure modes listed in the table of failure mode analysis. Note that for each failure mode the corresponding equivalent durations, resulting from the physics of failure model, have to be used. The following table contains the results.

TABLE 7

| Assembly | Component | Failure Mode acc. to VDI 3822 | beta | demonstrable survival probability | demonstrable Availability | Total risk number | Beta a | Beta b | projected survival probability | projected Availability |
|---|---|---|---|---|---|---|---|---|---|---|
| Connecting Plate | Connecting plate | Leckage | 2 | 0.7442 | 0.99852 | 4 | 33.12 | 1.00 | 0.9707 | 0.99985 |
| Connecting Plate | Connecting plate | High cycle fatigue | 2 | 0.9935 | 0.99997 | 4 | 357.14 | 1.00 | 0.9972 | 0.99999 |
| Axial piston unit | Cylinder | Thermal overload | 2 | 0.1903 | 0.99170 | 10 | 1.65 | 1.00 | 0.6225 | 0.99763 |
| Axial piston unit | Cylinder | Wear | 2 | 0.1215 | 0.98946 | 10 | 1.65 | 1.00 | 0.6225 | 0.99763 |
| Axial piston unit | Piston | High cycle fatigue | 2 | 0.2888 | 0.99379 | 10 | 1.86 | 1.00 | 0.6501 | 0.99785 |
| Axial piston unit | Piston | Wear | 2 | 0.0859 | 0.98773 | 10 | 1.65 | 1.00 | 0.6225 | 0.99763 |
| Axial piston unit | Retraction unit | Wear | 2 | 0.1004 | 0.98851 | 10 | 1.65 | 1.00 | 0.6225 | 0.99763 |
| Axial Piston Unit | Retraction plate | High cycle fatigue | 2 | 0.3035 | 0.99404 | 10 | 1.93 | 1.00 | 0.6591 | 0.99792 |
| Axial Piston Unit | Retraction plate | Wear | 2 | 0.0656 | 0.98638 | 10 | 1.65 | 1.00 | 0.6225 | 0.99763 |
| Drive unit | Drive shaft | High cycle fatigue | 2 | 0.9881 | 0.99994 | 8 | 27.14 | 0.11 | 0.9958 | 0.99998 |
| Drive unit | Drive shaft | Wear | 2 | 0.0100 | 0.97697 | 8 | 4.48 | 1.00 | 0.8176 | 0.99899 |
| Controller Unit | Control piston | Wear | 2 | 0.0457 | 0.98457 | 2 | 90.02 | 1.00 | 0.9890 | 0.99994 |
| Controller Unit | Actuator | Wear | 2 | 0.8153 | 0.99898 | 4 | 33.12 | 0.67 | 0.9803 | 0.99990 |
| Controller Unit | Actuator | Leckage | 2 | 0.7323 | 0.99844 | 4 | 33.12 | 1.00 | 0.9707 | 0.99985 |

Table 7 is a demonstrable and projected survival probability and availability for the components and failure modes analysed for the hydraulic system.

f2. Aggregation to Projected (Un)-Availability Per Tree Node

The list of analyzed failure modes contains the failure modes which were identified as critical. From a statistical point of view it has to be assumed that some failure modes will occur later in customer's hands which were not detected a priori during the development. We estimate the number of total failure modes for one node as $n_t=n_f*(1+p/\max(1,d)+d/n_f)$, where $n_f$ is the number of failure modes identified at the node, p is the production risk and d the development risk. Both risk indicators p and d are extracted from the risk filter applied in step 3. There, the development risk d is the number of risks (Y) identified in the first 6 categories in the risk filter and the production risk p is the number of risks (Y) in the last 6 categories.

For example, for the connecting plate it is $n_f=2$ (two failure modes identified, compare above), d=3 (three risks (Y) among the first six risk columns in the risk filter) and p=1 (one risk (Y) among the last six columns in the risk filter), thus, we estimate $2*(1+\frac{1}{3}+\frac{3}{2})=34/6\approx6$ failure modes.

From failure behavior in general it is known (reference) that the failures which occur in customers' hands are not uniformly distributed over the different potential failure modes, rather they are highly concentrated on a small number of modes, i.e., on the <<problematic>> ones. The concentration measure of Lorenz and Münzner known from the literature is used here and modeled by a simple power function $x^k$ with $k\geq1$. The chart of FIG. 4 shows different concentration functions resulting from $k=\{1, 2, 4, 8, 16\}$.

Figure 4:
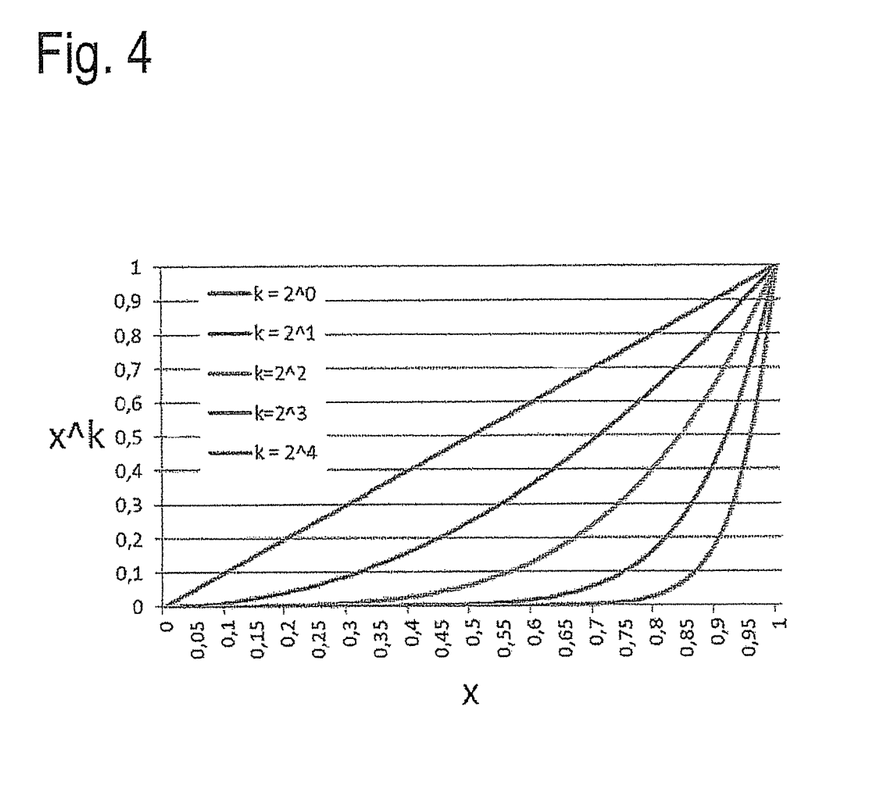
FIG. 4 illustrates a graph showing concentration function for different parameters.

In FIG. 4 the percentage of cumulated failures $x^k$ is depicted over the proportion of failure modes x. The relationship for $k=2^0=1$ is linear, for greater values of k increasingly parabolic. For example, a concentration function with k=8 implies that the most critical 10% of the failure modes cause 60% of all the failures.

Under the assumption of a concentration $k_0$ of failures over the $n_t$ failure modes of a component (node), the most critical failure mode, i.e., that with highest failure frequency, at this node may cause $(1-((n_t-1)/n_t)^{k0})*100\%$ of the at maximum allowed number of failures for the node (compare table with max. allowed # of failures in step 4).

It bears noting that when planning the tests, it is still unknown which of the failure modes will be the most critical one. However, if for each of the failure modes belonging to a certain node it can be demonstrated that it is better than the most critical assuming a concentration $k_0$, it can be concluded that the complete node will fulfill the availability target.

The table of targets in step 4 shows a max. allowable number of failures of 0.12 for the connection plate. With a concentration parameter k0=8 determined with existing warranty data we have for the most critical failure mode a target for the max. allowed number of failures of $(1-(5/6)8)*100\%\approx77\%$ of 0.12 failures, i.e., 0.092 failures. This leads to an availability target of 99.95% for each individual failure mode.

Aggregation of contribution of several failure modes to a component assessment is performed via the projected number of failures per component. The projected number of failures caused by the nf identified failure modes is estimated by $-\Sigma i \ln(Si*(ta))$, i=1, . . . , nf, assuming that the root causes of the single failure modes are independent. In addition, the number of failures caused by the remaining nt−nf failure modes is taken from the concentration function assuming that the top failure modes are the nf identified ones. Thus, this remaining number of failures is estimated by $((nt-nf)/nt)k0*100\%$ of the maximum allowed number of failures for the node.

Recall for the connecting plate that we have calculated a projected survival probability of 97.07% regarding the failure mode <<leakage>>. Regarding the second failure mode <<HCF>>, the projected survival probability is 99.72%. Thus, the projected total number of failures for node connecting plate is with of nf=2, nt=6 and k0=8 after ta=3600 h=−ln (0.9707)−ln(0.9972)+((6−2)/6)8≈0.072.

This principle of aggregation over failure modes is applied in analogous way to all the other components where failure modes have been analysed. For all other components it is assumed that the targets will be reached exactly. In this way, the complete tree is filled with the availability results bottom-up to the root. If the projection does not meet the target for the root it can be seen immediately by node-wise comparison with the corresponding targets where the gaps are located.

g. Increasing Severity of Test Program and h. Calculate Overall Availability

Table 8 illustrates the bottom-up aggregation of the availability values. The principle as described in the last step is applied for each component and recursivly for each assembly and finally for the system. For each projected number of failures, the projected availability can be calculated again on each step.

TABLE 8

| Tree Level | Node | Parent | Max. allowed # of Failures | Availability Target | Projected Number of Failures | Projected Availability | Validation Status |
|---|---|---|---|---|---|---|---|
| 0 (system) | Hydraulic System | NA | 2.000 | 0.9900 | 4.345 | 0.9783 | not sufficient |
| 1 (assembly) | Connection Plate | Hydraulic System | 0.125 | 0.9994 | 0.072 | 0.9996 | OK |
| 1 (assembly) | Control Disc | Hydraulic System | 0.025 | 0.9999 | 0.025 | 0.9999 | OK |
| 1 (assembly) | Axial Piston Unit | Hydraulic System | 1.100 | 0.9945 | 3.587 | 0.9821 | not sufficient |
| 1 (assembly) | Swash Plate | Hydraulic System | 0.050 | 0.9998 | 0.050 | 0.9998 | OK |
| 1 (assembly) | Drive Unit | Hydraulic System | 0.450 | 0.9978 | 0.488 | 0.9976 | not sufficient |
| 1 (assembly) | Controller Unit | Hydraulic System | 0.250 | 0.9988 | 0.123 | 0.9994 | OK |
| 2 (component) | Piston | Axial Piston Unit | 0.275 | 0.9986 | 0.983 | 0.9951 | not sufficient |
| 2 (component) | Cylinder | Axial Piston Unit | 0.275 | 0.9986 | 1.026 | 0.9949 | not sufficient |
| 2 (component) | Retraction Unit | Axial Piston Unit | 0.275 | 0.9986 | 0.608 | 0.9970 | not sufficient |
| 2 (component) | Retraction Plate | Axial Piston Unit | 0.275 | 0.9986 | 0.969 | 0.9952 | not sufficient |
| 2 (component) | Plate | Swash Plate | 0.025 | 0.9999 | 0.025 | 0.9999 | OK |
| 2 (component) | Bearings | Swash Plate | 0.025 | 0.9999 | 0.025 | 0.9999 | OK |
| 2 (component) | Drive Shaft | Drive Unit | 0.225 | 0.9989 | 0.263 | 0.9987 | not sufficient |
| 2 (component) | Bearings | Drive Unit | 0.225 | 0.9989 | 0.225 | 0.9989 | OK |
| 2 (component) | Control Piston | Controller Unit | 0.111 | 0.9995 | 0.050 | 0.9997 | OK |
| 2 (component) | Actuator | Controller Unit | 0.139 | 0.9994 | 0.073 | 0.9996 | OK |

Table 8 is an aggregation of the projected number of failures and the availability to assess the validation program.

As long as the mean time to repair is assumed to be equal for all components (as in our demonstration example), it does not matter whether one compares the projected number of failures or the availability with the corresponding target. However, this is typically not the case. Therefore as standard, the availability will be used for the assessment.

The availability comparison in the first row shows that the target for the complete system is not reached. Thus, the validation program is not sufficient. On the assembly level, it can be seen that the validation program is sufficient for the connecting plate and for the controller unit. Since for the control disc and the swash plate no risks have been identified, it is assumed that these assemblies will reach their availability target even without optimisation the validation program.

For the axial piston unit and the drive unit, the validation program is not sufficient.

In table 8 it can be seen that all components of the axial piston unit as well as the drive shaft are not sufficiently validated. The biggest gap appears for the cylinder of the axial piston unit whereas the validation for the drive shaft is rather close to the target.

Analyzing the existing tests shows that none of them provide an equivalent duration for the cylinder greater 2500 h. Extension of the tests is not possible for practical reasons. So, a new axial piston stress test has to be developed. According to the failure mode consideration should cover HCF, wear and thermal overload for the analyzed locations. If such a test would provide at least 9000 h of equivalent duration for each of the analyzed failure modes, in addition 2 such tests would be required. The biggest gap in the validation of the drive shaft is located at the failure mode "wear". Only the vehicle test provides validation contribution here. Since the validation is already close to the target it would be sufficient in this case to increase the damage intensity of the vehicle test by a factor 2. This could be reached by increasing the test stress correspondingly.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for testing the reliability of a system, the method comprising:
    establishing a system hierarchy of several levels by identifying components of the system;
    identifying and assigning failure modes to the components of the system;
    determining test procedures for failure modes of different components to obtain estimates for an availability of the component and selecting a first test;
    identifying a hierarchical level for allocating availability targets to the components, and establishing a hierarchical decomposition of the system;
    allocating availability targets to the identified components by qualitative methods considering experience, criticality of failures and novelty of design or material, the availability targets combined resulting in an overall availability target of the system, and identifying those targets which need to be analyzed;
    calculating a projected availability of all components, having targets which need to be analyzed, which is an estimate of the most probable value of availability provided that the tests are successful;
    identifying components for which availability targets are not met by the projected availability targets and select a second test to improve projected availability or increase severity of tests already selected until the availability targets are met; and then
    calculating an overall availability of the system,
    wherein, after having allocated the availability targets, calculating a demonstrable availability representing a lower boundary of an availability at a certain confidence level provided that the tests are successful, and deriving the projected availability from the demonstrable availability.

2. The method of claim 1, wherein in the selecting of the second test, the lowest possible level in the system hierarchy is investigated first.

3. The method of claim 1, wherein initially, tests are selected which are performed for other purposes.

4. The method of claim 1, further comprising applying a physics of failure model to assess selected tests regarding contribution to projected availability.

5. The method of claim 4, wherein selection of the second test to improve demonstrable availability is performed in accordance with a ranking established in accordance with the physics of failure model.

6. The method of claim 1, wherein if a failure mode is not identified for a component, the availability target is deemed to be fulfilled.

7. The method of claim 1, wherein different tests are carried out and combined to calculate risk of a specific failure mode.

8. The method of claim 1, wherein the calculation of overall availability is conducted under assumption of a beta distribution.

9. The method of claim 1, wherein after calculating the overall availability of the system, tests are carried out and an evaluation is conducted to determine whether additional tests, design changes or other actions are needed due to failed tests.

10. The method of claim 9, wherein after conducting tests, the planned test contributions are replaced by actual test contributions.

11. A method comprising:
    determining test procedures for failure modes of different components to obtain estimates for an availability of the component and selecting at least a first test;
    establishing a hierarchical decomposition of a system by identifying a level for allocating availability targets to components of the system;
    allocating availability targets to the components by qualitative methods considering experience, criticality of failures and novelty of design or material, combining the availability targets to obtain an overall availability target of the system, and identifying those targets which need to be analyzed;
    calculating a projected availability of all components, having targets which need to be analyzed;
    identifying components for which availability targets are not met by the projected availability targets and select at least a second test to improve projected availability or increase severity of previously selected tests until the availability targets are met; and then
    calculating an overall availability of the system,
    wherein, after having allocated the availability targets, calculating a demonstrable availability representing a lower boundary of an availability at a certain confidence level provided that the tests are successful and deriving the projected availability from the demonstrable availability.

12. The method of claim 11, further comprising applying a physics of failure model to assess selected tests regarding contribution to projected availability.

13. The method of claim 12, wherein selection of the second test to improve demonstrable availability is performed in accordance with a ranking established in accordance with the physics of failure model.

14. The method of claim 11, wherein if a failure mode is not identified for a component, the availability target is deemed to be fulfilled.

15. The method of claim 11, wherein different tests are carried out and combined to calculate risk of a specific failure mode.

16. The method of claim 11, wherein the calculation of overall availability is conducted under assumption of a beta distribution.

17. The method of claim 11, wherein after calculating the overall availability of the system, tests are carried out and an evaluation is conducted to determine whether additional tests, design changes or other actions are needed due to failed tests.

18. The method of claim 17, wherein after conducting tests, the planned test contributions are replaced by actual test contributions.

19. A method of determining the availability of a hydraulic system, the method comprising:
   establishing a hierarchical structure of each component of the hydraulic system;
   assigning a failure mode to each component;
   assigning a first quality test to the failure mode of each component;
   allocating availability targets to each of the components;
   calculating a projected availability of each component;
   comparing the projected availability to the availability target of each component;
   performing a second quality test to the failure mode of each component based on a result of the comparing, and
   calculating an overall availability of the system,
   wherein, after having allocated the availability targets, calculating a demonstrable availability representing a lower boundary of an availability at a certain confidence level provided that the tests are successful, and deriving the projected availability from the demonstrable availability.

* * * * *